United States Patent [15] 3,696,661
Garabrant et al. [45] Oct. 10, 1972

[54] METHOD AND APPARATUS FOR MEASURING THE YIELD STRESS OF NON-NEWTONIAN FLUIDS

[72] Inventors: Arthur R. Garabrant; Alan Beerbower, both of Westfield; James A. Wilson, Stanhope, all of N.J.

[73] Assignee: Esso Research and Engineering Company

[22] Filed: Dec. 11, 1969

[21] Appl. No.: 884,138

[52] U.S. Cl. ............................73/54, 73/32, 73/71.5
[51] Int. Cl. ........................G01n 29/00, G01n 11/10
[58] Field of Search.............73/54, 53, 32, 71.5, 71.6

[56] References Cited

UNITED STATES PATENTS 3,516,283  6/1970  Abbotts.....................73/32 X

Primary Examiner—Louis R. Prince
Assistant Examiner—Joseph W. Roskos
Attorney—Manahan and Wohlers and Donald F. Wohlers

[57] ABSTRACT

A method and apparatus for measuring the yield stress of a non-Newtonian fluid possessing a yield stress. A small sample of the fluid is disposed in a test cell with a solid particle of known specific gravity and geometry. The sample is vibrated by an electronic means so as to generate an alternating, asymmetric displacing force; and, at the first displacement of the particle, the amplitude and frequency of the vibrations is electronically measured. The yield stress is determined as a function of the amplitude and frequency of the vibration at the time of initial displacement.

22 Claims, 3 Drawing Figures

METHOD AND APPARATUS FOR MEASURING THE YIELD STRESS OF NON-NEWTONIAN FLUIDS

BACKGROUND OF THE DISCLOSURE

The instant invention is directed generally to a new method and apparatus for measuring the yield stress of a non-Newtonian fluid. The invention is further directed to a method and apparatus for determining the yield stress of a non-Newtonian fluid under actual operating conditions. More specifically the instant invention is directed to a method and apparatus for measuring the yield stress of a non-Newtonian fluid under the effects of vibration.

The yield stress of a non-Newtonian fluid is an important rheological property of the fluid. While there are many methods of measuring the yield stress of a non-Newtonian fluid (such as the ASTM D–1092 and D–217 Methods, the GM Forced Ball Method, and viscometric techniques employing the Shirley-Ferranti, the Brookfield, and the Haake viscometer) they are relatively imprecise, requiring large amounts of sample and extensive cleaning of the equipment after each test. Thus, in the preceding methods, between 10 and 1,000 grams of sample are used in each determination; and the retaining cup and moving parts of the instruments used therein must be cleaned after each determination.

All of the above methods, except the ASTM D–217 Method, do not measure the yield stress directly but rather measure the apparent viscosity at various shear rates. This information is then used to estimate the yield stress. The fluid undergoes mechanical working while under investigation, with possible changes in gel structure and rheological properties. Hence, determination of the yield stress under static conditions is impossible. Thus, in the above-identified tests, it is impossible to determine the yield stress under the conditions of actual interest. This is important since many non-Newtonian fluids or gels have yield stresses which depend upon their shear history. Thus, it is important to measure the yield stress while the fluid is not undergoing actual shear.

SUMMARY OF THE INVENTION

The method and apparatus of the instant invention presents a superior and novel means for measuring the yield stress of a non-Newtonian fluid possessing a yield stress. A small sample is tested under actual operating conditions in low cost test cells that are discarded after each test. In accordance with the instant invention a small sample of a non-Newtonian fluid possessing a yield stress is disposed in a test cell along with a solid particle of known geometry and a specific gravity different from that of the fluid. The sample containing the solid particle and the non-Newtonian fluid is vibrated by electronic means. Means are used to determine the initial displacement of the particle during vibration. The amplitude and frequency of the vibrations, which are monitored during the vibrating period, are recorded at the time of initial displacement of the particle. Yield stress is determined from a mathematical formula in which the only unknowns are the frequency and amplitude of the vibrations.

BRIEF DESCRIPTION OF THE DRAWINGS

The invention may be better understood by reference to the accompanying drawings of which.

DETAILED DESCRIPTION

Figure 1:
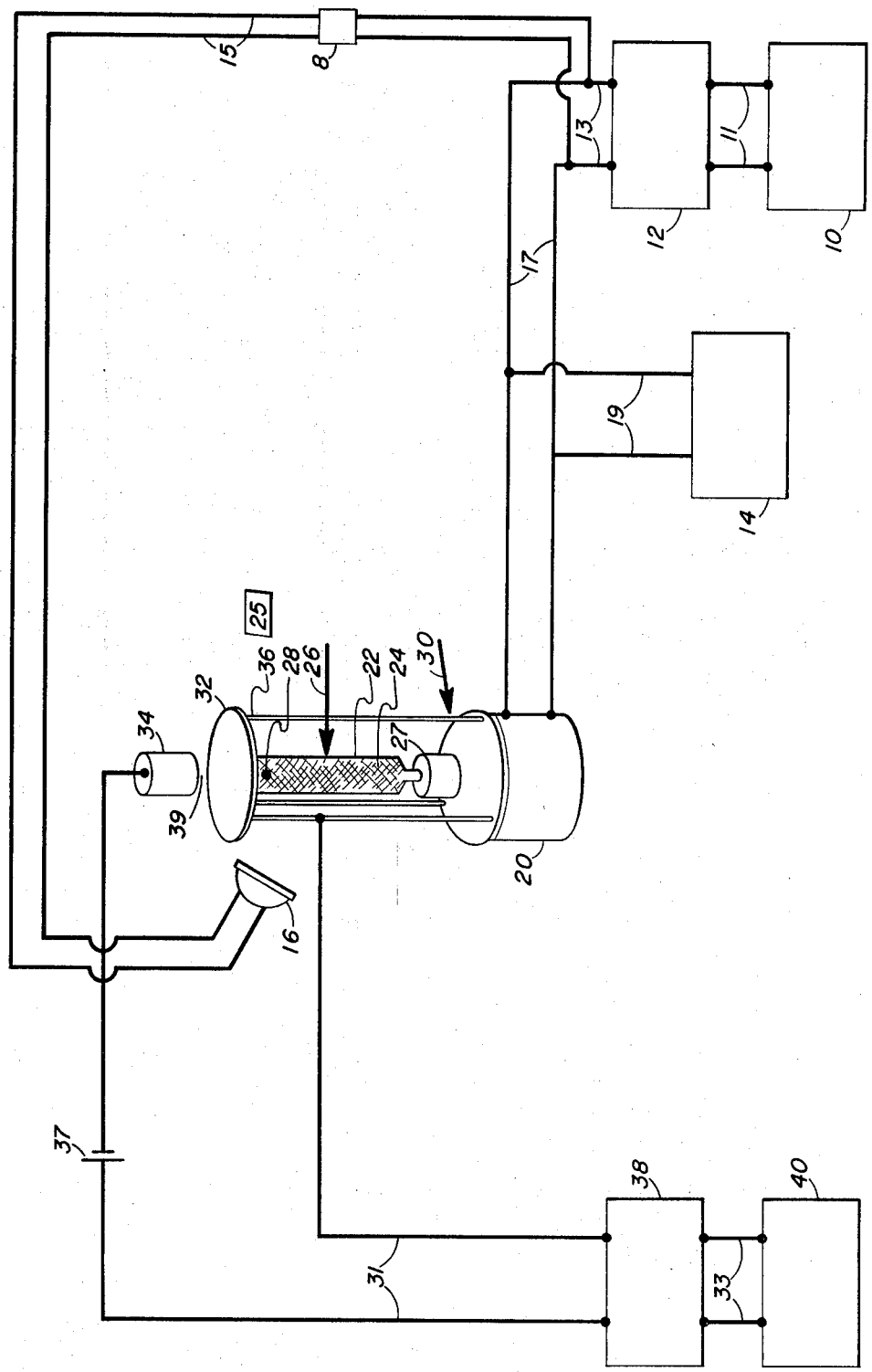
FIG. 1 is a schematic representation of the instant invention.

The apparatus of the instant invention is schematically represented in FIG. 1. FIG. 1 is a flow diagram that starts with a signal generator 10 connected electrically by means of electrical conduits 11 to an electrical amplifier 12. The signal generator 10 generates a signal which is then amplified by the amplifier 12. The signal may be of regular, i.e., sinusoidal, or irregular wave form or frequency. In the latter case, a recording of any signal that the experimenter wishes to examine may be used. The amplified signal is electrically transmitted through electrical conduits 13 to two parallel electrical conduit branches 15 and 17. Electrical conduit 17 conducts the amplified signal to a transducer generally indicated at 20. Another electrical conduit 19 may be inserted into line 17 for purposes of measuring the power being transmitted to the transducer 20. Thus, in a preferred embodiment a wattmeter 14 is connected to electrical conduit 19 to measure the power input. It should be appreciated that this measurement of the power is optional and desirable in order to prevent an overloading of the transducer 20.

The amplified signal emitted from amplifier 12 through electrical conduit 13 is also transmitted to a second electrical conduit 15. Conduit 15 transmits the amplified signal via a triggering device 8 to a strobe light 16. Thus, the strobe light 16 flashes at the same frequency as the transducer 20 as will be described in greater detail hereinafter.

The transducer 20 comprises a vibrating member 30 which is electrically connected to electrical conduit 17. Thus, the amplified signal is conducted to the vibrating member 30, which in a preferred embodiment is a loudspeaker. The vibrating member 30 vibrates at the frequency and amplitude transmitted to it by the amplified signal.

Vibrating member 30 is connected to a holding means 27. The holding means 27 provides a stand on which a loaded test cell generally indicated at 26 is disposed. In a preferred embodiment the holding means 27 comprises a threaded vial cap which is cemented to the vibrating member 30. The test cell 26 includes a transparent cylindrically shaped receptacle 22. The receptacle 22, which is closed at one end, must be transparent since it is optically viewed by the human eye. In addition, it is preferably cylindrically shaped so as to permit it to be viewed from any angle. The receptacle 22 is charged initially with a solid particle 28 of known geometry by dropping the particle 28 to the closed end of the cylindrically shaped transparent receptacle 22. A non-Newtonian fluid or gel 24, possessing a yield stress which is to be tested, is then poured into the receptacle 22 thus entrapping the particle 28 at the closed end of the receptacle 22. This procedure is followed if the particle 28 has a specific gravity greater than that of the fluid 24 for reasons to be explained hereinafter. The receptacle 22 is tapped to expel any air bubbles that may be entrapped within the fluid 24. When the charged test cell 26 is completely free of air or any other foreign objects, the test cell 26 is inverted and inserted in the holding means 27. In a preferred embodiment the test cell is a 1 gram glass vial threaded at the top thus permitting the cell to be connected to the vial cap holding means 27. FIG. 1 illustrates the case where the particle 28 has a specific gravity greater than that of the fluid 24.

Alternatively, if the particle 28 has a specific gravity less than the gel 24 the particle 28 is disposed at the open end of the receptacle 22 above the holding means 27. The particle 28 is charged in the test cell 26 by placing the particle 28 at the center of the cap 27 and placing the charged cell 26 over it, after any air bubbles have been expelled.

In another alternate embodiment for the case where the particle 28 has a lower specific gravity than the gel 24, the cell 26 may be charged by the method analogous to that used to charge the cell when the particle 28 has a specific gravity greater than the gel 24. That is, the particle is placed in the closed end of the receptacle 22 and the non-Newtonian fluid 24 poured over it. The charged cell 26 is then connected to the cap 27 with the closed end of the receptacle 22 at the bottom. The cap 27 is cemented to a capacitance plate 32 disposed above the charged cell 26.

Returning now to the embodiment illustrated in FIG. 1, keeping in mind, that the vibrating cell 26 may contain a particle whose specific gravity is more or less than that of the gel 24, means are provided for determining the initial displacement of the particle 28 when the particle 28 is vibrated. In one preferred embodiment illustrated in FIG. 1 optical means are employed. In this embodiment an optical means 25 is disposed so that the particle 28 may be easily viewed by the experimenter. In one preferred embodiment a six power telescope is employed to view the particle. It should be appreciated that different power telescopes may also be employed for this function. In another preferred embodiment the box designated 25 represents a magnifying glass that is employed in viewing the particle. The experimenter is able to view the vibrating particle as if it were stationary due to the effect of the intermittent flashing of the strobe light 16 as will be described in greater detail hereinafter.

In many instances the non-Newtonian fluid 24 that is tested is opaque. When this is the case, optical means cannot be employed. Instead, radioactive means are employed to determine the initial displacement of the vibrating particle 28. When radioactive means are employed, the receptacle 22 comprises a radiation opaque material so that no radiation emits therefrom. In a preferred embodiment, lead is used for this purpose. However, a single radiation transparent slit is provided adjacent to the particle 28. Any radiation transparent material such as copper may be employed for this purpose. A fast response radiation sensing device, designated on FIG. 1 as 25 is aligned adjacent to the slit. In a preferred embodiment the device 25 is a Geiger counter. The device 25 may be attached to a strut 36 to be described hereinafter, so that it vibrates at the same frequency as the transparent slit. Alternatively, the radiation sensing device 25 may be separately mounted, in alignment with the slit. This disposition of the device 25 has the advantage of more stable mounting but does not provide continuous monitoring of the particle 28. Thus, there is an instant of time before the experimenter is certain the particle 28 has moved beyond the transparent slit.

The particle 28, in this embodiment is radioactive emitting radiation which is detected by the device 25. When the yield stress of the gel 24 is exceeded, the particle 28 moves down or up depending upon whether it is disposed at the top or bottom of the receptacle 22 respectively. When this occurs the particles move out of alignment with the slit and into alignment with the radiation opaque material. Thus, the radiation detector 25 no longer detects any radiation. At this time, the amplitude and frequency of the vibration is measured, thus indicating the parameters necessary to calculate the yield stress.

The transducer 20, which includes the vibrating member 30, the holding means 27, and the charged test cell 26 also includes in one preferred embodiment, a capacitance plate 32 disposed above the charged test cell 26 by means of a plurality of struts 36 which connect the plate 32 to the vibrating member 30. In addition, struts 36 provide an electrical connection from the transducer 20 to an amplitude measuring device 38, which will be described in greater detail below. A displacement sensor 34 is disposed above the plate 32. The sensor 34 and the plate 32 are separated by a gap 39. The displacement sensor 34 is connected to an amplitude measuring device 38. The displacement sensor 34 and one of the plurality of struts 36 which is in electrical communication with the plate 32 are both connected to the amplitude measuring device 38 by means of an electrical conduit 31. The amplitude measuring device 38 measures the capacitance between the transducer 20 or more particularly the plate 32 and the displacement sensor 34. Since the plate 32 moves up and down due to the vibrations of the transducer, the impedance measured by the device 38 varies directly as a function of the distance between the plate 32 and the sensor 34. This variation is a measure of the amplitude of the vibrations. Thus, the amplitude is a function of varying capacitance as measured by the amplitude measuring device 38.

Figure 2:
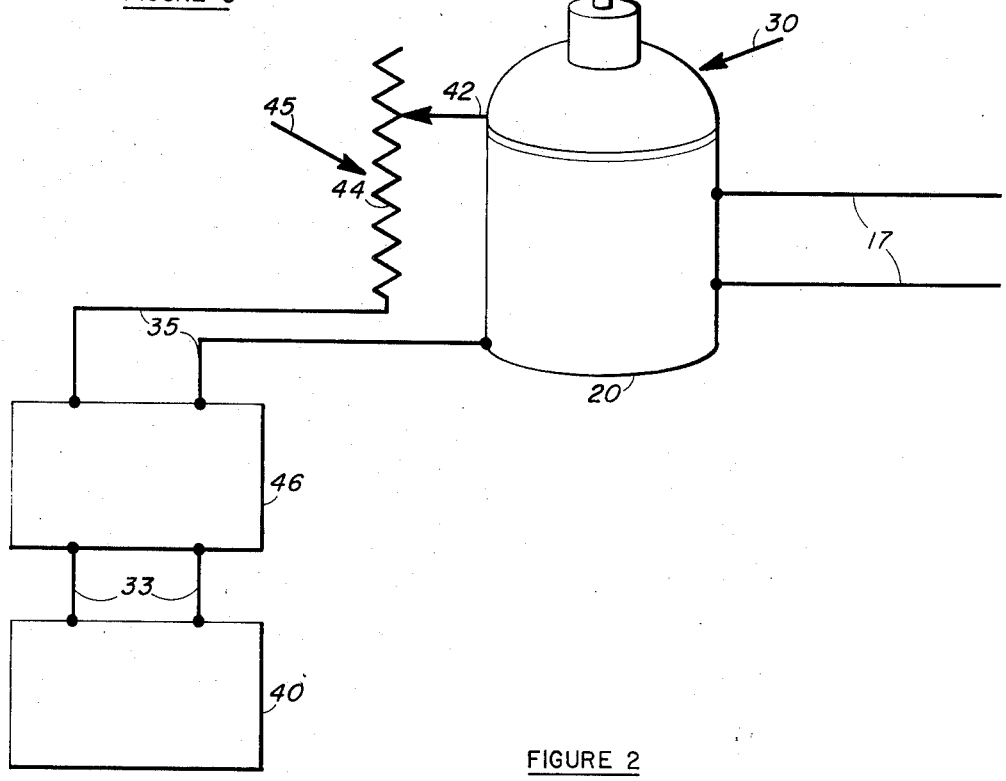
FIG. 2 is a portion of the instant invention showing an alternate embodiment.

Turning briefly to FIG. 2, another preferred embodiment of an amplitude measuring device is illustrated. In this alternate embodiment, the charged test cell 26 is again connected to the vibrating member 30. However, a pointer 42 is electrically connected to the vibrating member 30 and it is in electrical communication with a resistor 44. Thus, a rheostat type arrangement generally indicated at 45 is formed. As the transducer 20 is vibrated, the amplitude of the vibrations is manifested by the up and down movement of the pointer 42. Hence, the amplitude of the vibrations is indicated as a variation in resistance as measured by an amplitude measuring device 46. An electrical conduit 35 is provided for linking the terminals of the rheostat 45 to the amplitude measuring device 46. An impressed EMF is provided by any conventional voltage source (shown in FIG. 1 at 37). Thus, the variation in resistance is manifested as a variation in current, in a preferred embodiment where the amplitude measuring device 46 is an ammeter.

Figure 3:
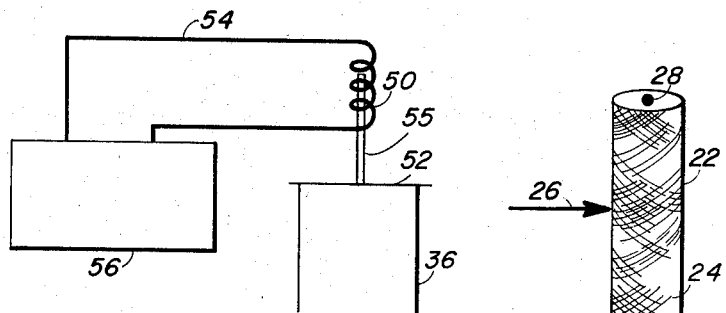
FIG. 3 is a portion of the instant invention showing still another alternate embodiment.

FIG. 3 depicts a third amplitude measuring device. A magnetic bar 55 rises above a plate 52, to which it is attached. It should be appreciated that plate 52 has a different function from the plate 32 depicted in FIG. 1. Plate 52 which is connected to the vibrating transducer by means of the struts 36, vibrates the bar 55 at the same frequency and amplitude as that impressed on the transducer. The bar 55 is disposed inside an inductance coil 50, which is electrically connected by means of line 54 to the amplitude measuring device 56. In a preferred embodiment the device 56 is an oscilloscope. An impressed voltage is provided to the circuit by means of any convention voltage source (not shown in FIG. 3). The amplitude of the vibrations is indicated by a variation in voltage measured by the oscilloscope 56. This variation is caused by the variation of the generated voltage of the circuit caused by the movement of the bar 55 inside the inductance coil 50.

Returning now to FIG. 1, the amplitude measuring device 38 (alternately 42 or 56) is connected to a frequency measuring device 40 by means of an electrical conduit 33. In a preferred embodiment, the frequency measuring device 40 is an oscilloscope. In another preferred embodiment the frequency measuring device 40 is again an oscilloscope but in this embodiment the oscilloscope is connected to a computer. The former embodiment is employed when a constant frequency is employed. For example, if a sinusoidal wave form is used to generate an electrical signal to the transducer, it is enough to determine the frequency of the vibrations from an oscilloscope. However, if a recording of an environment in which a non-Newtonian fluid is to be subjected to is used, then the frequency almost always varies as a function of time. In such a case of varying frequency, a computer is connected to the oscilloscope in order to determine the effective frequency at the period of time when the particle 28 is displaced from the frequency data generated on the oscilloscope. It should be appreciated that where the signal generator 10 generates its own sinusoidal or other regular frequency waves, there is really no need for the frequency measuring device 40 since there is very little change in frequency between the generator 10 and the transducer 20. However, in order to equip the device of the instant invention for use with all generated signals, it is necessary to include the frequency measuring device 40.

In operation, the test cell receptacle 22 is loaded with the non-Newtonian fluid 24, and the particle 28 to form the charged test cell 26 as described above. The cell 26 is connected to the holding means 27. An electrical signal generated by the signal generator 10 is then fed to the vibrating member 30 of the transducer 20 by means of electrical conduit lines 11, 13 and 17. The amplifier 12 is in series with the signal generator 10 and it acts to vary the amplitude of the generated signal. This in turn serves to change the height of the vibrations. Thus, the transducer 20 is vibrated at the frequency and amplitude dictated by the signal generator 10 and the amplifier 12. Because of the limitations of most commercial transducers, the power generated by the signal transmitted to the transducer 20 is monitored by a wattmeter 14. The wattmeter 14 is placed in line 17 and is monitored so that the power input is not so great as to damage the transducer 20 because of overloading.

In most applications, the yield stress of the non-Newtonian fluid is determined by generating a fixed frequency signal such as a sinusoidal signal to the transducer 20 and gradually increasing the amplitude thus increasing the vibratory forces until the yield stress is reached. However, it should be appreciated that this process can be accomplished in another way. That is, a fixed amplitude may be generated and the frequency increased so that the vibratory forces again increase until the yield stress is reached. Alternatively, a combination of increasing the amplitude and the frequency of the signal may be employed to increase the shear forces on the fluid 24.

The signal that is directed to the transducer 20 is similarly sent to the strobe light 16 by means of electrical line 15 and a triggering device 8. The experimenter views the particle 28 in the charged test cell 26 by the optical means 25. It is only because of the effect of the strobe light 16 that such observation can be made. The strobe light 16 is directed to the particle 28. The light 16 flashes at the frequency of the signal generated to the transducer 20. Since the strobe light 16 flashes at one point in the time period of the frequency, it illuminates the particle 28 at only one amplitude in that period. Thus, the particle 28 is stationary to the observer. It is obvious that it would be difficult for an observation to be made of the relative movement of the vibrating particle 28 in the absence of such a periodically flashing light. The observer views the seemingly stationary particle 28 until that particle 28 moves. When such movement occurs the yield stress is reached, since the non-Newtonian fluid 24 is no longer able to support the particle 28. The significance of the requirement that the particle 28 have a different specific gravity than the fluid 24 is now apparent. If this were not the case the particle 28 would have not demonstrated any discernable movement even after the yield stress was exceeded.

The determination of the yield stress of an opaque gel is made by analogous procedure. Here the yield stress is reached at the time when the radiation sensing device 25 no longer measures the radiation emitted from the radioactive particle 28. At this point, the yield stress of the gel 24 is exceeded since the particle 28 has moved up or down past the radioactive transparent slit. Once the measurements have been made with the use of the above disclosed instrument, the yield stress may be calculated using the equation given as follows:

$Y = R[13.16 \rho s W^2 r + 327 (\rho s - \rho f)]$

Where:
 $Y$ = yield stress (dynes per square centimeter)
 $R$ = radius of the particle (centimeters)
 $\rho s$ = density of the particle (grams per cubic centimeter)
 $\rho f$ = density of the fluid (grams per cubic centimeter)
 $W$ = the frequency of the oscillation (cycles per second)
 $R$ = maximum amplitude (centimeters)

A second test relating to gel yield stress may be performed by the apparatus of the instant invention. That is, a test to determine the suitability of a non-Newtonian fluid to a specific vibrating environment. In a typical situation a recording is made of the sound waves of the vibrating regime to which the gel is to be subjected. The recording is inputed to the signal generator 10 which generates a signal of varying frequency and amplitude, which results in transducer 20 producing vibrations equal to the vibrations the gel would be subjected if placed in the environment in question. If the yield stress is exceeded by the method of the instant invention the gel cannot be used in that environment. It is obvious that such a procedure can result in large savings in testing non-Newtonian fluids. Oftentimes the gel is explosive and in such a case this procedure would seem to be indispensable.

A third procedure that may be employed using the apparatus of the instant invention comprises a method to determine the effect of vibrations on gel stability. In this test, the previously described method of determination of yield stress is employed. It should be appreciated that the determination of yield stress is made with a minimum of amount of vibration outside the suspected range of frequency and amplitude at which the yield stress of the gel is exceeded. Alternately, no test of gel yield stress is made if the gel has a well-known or previously determined yield stress.

After the yield stress of the gel is determined in the absence of cold working, a sample of the gel is subjected to various predetermined vibratory regimes. After this vibration, the yield stress of the gel is again tested by the above described method. Thus, the effect of vibration is determined as a function of gel yield stress.

Several methods may be employed to determine the amplitude and the frequency of the vibrations at the point in time of particle displacement. In one preferred embodiment, a stop watch calibrated to a chart recording amplitude and frequency as a function of time may be employed. Thus, the amplitude and frequency at the time stopped by the operator which corresponds to initial particle movement is used to determine the amplitude and frequency of the vibrations at the point when the yield stress is reached.

Alternately, a camera may be mounted in front of the frequency and amplitude measuring devices. Upon movement of the ball as detected by optical or nuclear means, the operator snaps the shutter taking a picture of the measuring devices at the instant when the yield stress of the gel is exceeded.

The yield stress is determined by a relation which is a function of the physical properties of the fluid 24 and the particle 28, which are known, and the amplitude and frequency which is determined by the above procedure.

It should be understood that the above described preferred embodiments do not constitute the limits to the instant invention. The instant invention includes various modifications which may be made without departing from the fundamental invention herein disclosed.

What is claimed is:

1. An apparatus for measuring the yield stress of a non-Newtonian fluid comprising:
   a. a sample of a non-Newtonian fluid possessed of a yield stress, disposed in a test cell;
   b. a solid particle of known geometry and a specific gravity different from said fluid, disposed in said sample;
   c. electronic means for vibrating said particle and sample;
   d. means for determining the initial displacement of said particle when said particle is vibrated; and
   e. electronic means for determining the amplitude and frequency of said vibrations when said displacement occurs.

2. The apparatus of claim 1 wherein optical means are employed to determine the initial displacement of said particle when said particle is vibrated.

3. The apparatus of claim 2 wherein said optical means comprises a strobe light and magnification means, said strobe light electrically connected to said electronic means for vibrating said sample so that said strobe light emits light directed at said particle at a frequency equal to the frequency of said vibrating particle, and said magnification means disposed so as to manually view said particle, said means indicating the initial displacement when said particle is no longer viewed by said magnification means.

4. The apparatus of claim 1 wherein said solid particle is radioactive and radioactive means are employed to determine the initial displacement of said particle when said particle is vibrated.

5. The apparatus of claim 4 wherein said radioactive means comprises a radioactive opaque test cell, in which said sample and particle are disposed except for a radiation transparent slit adjacent said radioactive particle; a radiation sensing device disposed adjacent to said slit; whereby said means indicate the initial displacement when said sensing device no longer senses the radiation emitted by said radioactive particle.

6. The apparatus of claim 1 including a transducer in which said sample contained in a test cell is disposed.

7. The apparatus of claim 6 wherein said electronic means for vibrating sample comprises a signal generator and an amplifier electrically connected to said transducer.

8. The apparatus of claim 6 wherein said electronic means for determining the amplitude of said vibrations comprises a capacitance plate disposed at one end of said transducer, a displacement sensor disposed adjacent to said plate but separated by a gap, said capacitance plate and said sensor connected to an amplitude measuring device whereby the amplitude of said vibrations is determined as a change in capacitance measured on said amplitude measuring device.

9. The apparatus of claim 6 wherein said electronic means for determining the amplitude of said vibrations comprises a movable pointer electrically connected to said transducer, a resistor electrically connected to said pointer, an amplitude measuring device electrically connected to said pointer and said resistor whereby the amplitude of said vibrations is determined as a change of resistance measured on said amplitude measuring device.

10. The apparatus of claim 6 wherein said electronic means for determining the amplitude of said vibrations comprises a magnetic bar disposed on said transducer, an induction coil disposed around said bar, an amplitude measuring device electrically connected to said induction coil whereby the amplitude of said vibrations is determined as a change in inductance measured on said amplitude measuring device.

11. A method for measuring the yield stress of a non-Newtonian fluid comprising:

a. vibrating a sample comprising said non-Newtonian fluid possessing a yield stress and a particle of known geometry and a specific gravity different from said fluid disposed in said fluid;

b. determining the point in time when said particle is initially displaced from its original position, while said sample is being vibrated;

c. recording the amplitude and frequency of the vibration at the point in time when the said particle is initially displaced.

12. The method of claim 11 including the step of disposing the sample in a transducer prior to vibrating said sample.

13. The method of claim 12 wherein the sample is vibrated by generating and amplifying an electrical signal which is communicated to said transducer.

14. The method of claim 12 whereby the amplitude of the vibration of the sample at the time of initial displacement is determined by measuring the capacitance between a plate electrically connected to said transducer and a displacement sensor disposed adjacent to said plate but separated by a gap, whereby the amplitude of said vibration is reflected as a variation in capacitance.

15. The method of claim 12 whereby the amplitude of vibrations at the time of initial displacement is determined by measuring the resistance between a movable pointer connected to the said transducer and one end of a resistor in contact with said movable pointer whereby the amplitude of said vibration is determined by the variation in resistance.

16. The method of claim 12 whereby the amplitude of the vibration at the time of initial displacement is determined by measuring the inductance in a coil disposed around a magnetic bar disposed on said transducer whereby the amplitude of the vibration is determined by the variation in inductance.

17. The method of claim 11 including the step of periodically flashing a light source at the particle at a frequency equal to that of the vibrating particle.

18. The method of claim 17 wherein the point in time when said particle is initially displaced is determined by viewing the periodically lighted particle by magnification means to determine the first displacement of said particle.

19. The method of claim 11 wherein the point in time when said particle is initially displaced is determined by the steps comprising:

a. disposing a radioactive particle and the non-Newtonian fluid in a test cell whose walls are opaque to radioaction;

b. providing a radiation transparent slit adjacent to the particle;

c. measuring the radiation emitted by the particle by means of a radiation sensing device disposed adjacent said transparent slit while said cell is vibrated;

d. detecting the initial displacement when said sensing device no longer detects the radiation emitted by said particle.

20. The method of claim 11 whereby the frequency of the vibrations of the sample at the time of initial displacement is determined by displaying the frequency of the vibrations on an oscilloscope.

21. A method of testing the stability of a gel when exposed to a vibratory environment comprising:

a. recording the sound produced by said vibratory environment;

b. generating an electrical signal from said recording;

c. vibrating a sample containing the gel in which a particle of known geometry and specific gravity different from said gel is disposed at the frequency and amplitude of said electrical signal;

d. viewing said particle to determine if said particle is displaced from its original position during said vibration.

22. A method to determine the effect of vibration on the yield stress of a gel comprising:

a. exposing a sample containing said gel and a particle of known geometry and a specific gravity different from said gel to a predetermined vibratory regime, said regime designed to produce stresses less than the known yield stress of said gel; thereafter b. increasing the stress on said gel by means of said vibrations;

c. determining the point in time when said particle is initially displaced from its original position; and d. recording the amplitude and frequency of the vibration at the point in time when said particle is initially displaced whereby the yield stress of the gel under the predetermined vibratory regime is determined.

* * * * *